Aug. 6, 1968    C. S. BOWYER    3,396,300
PROPORTIONAL COUNTER TUBE HAVING A PLURALITY OF
INTERCONNECTED IONIZATION CHAMBERS
Filed Dec. 30, 1965
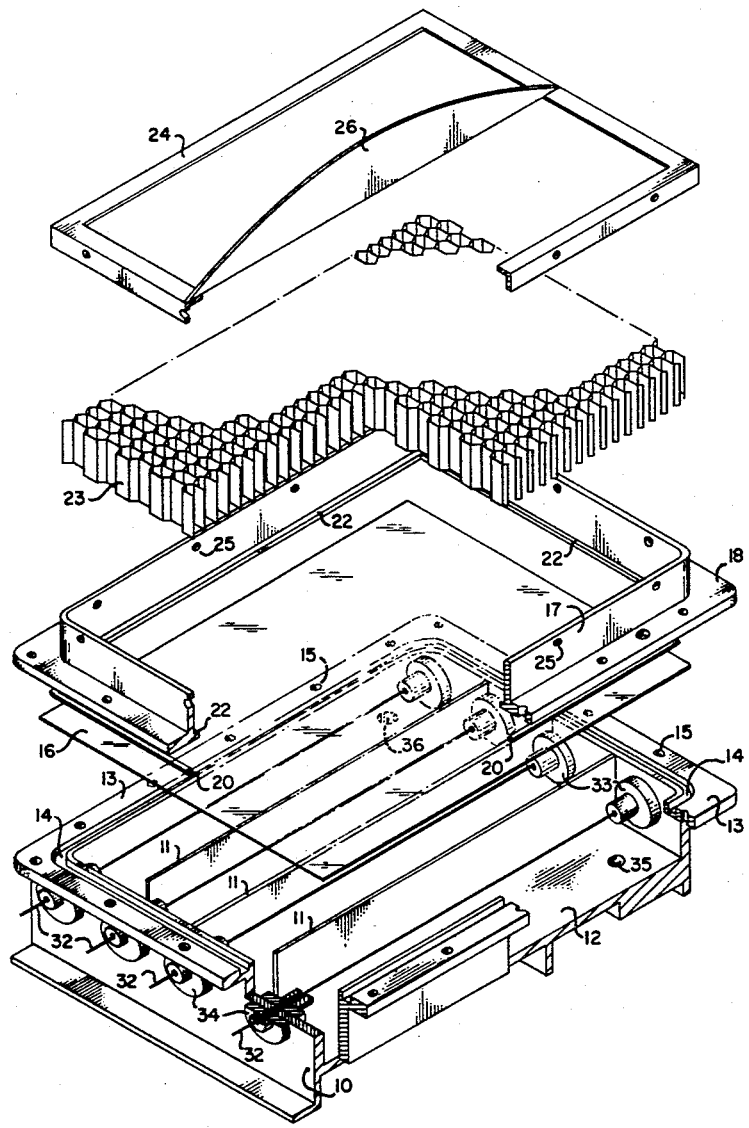
INVENTOR
CHARLES S. BOWYER
BY *Melvin L. Crane* AGENT
*[signature]* ATTORNEY United States Patent Office 3,396,300
Patented Aug. 6, 1968

3,396,300
PROPORTIONAL COUNTER TUBE HAVING A PLURALITY OF INTERCONNECTED IONIZATION CHAMBERS
Charles S. Bowyer, Hyattsville, Md., assignor to the United States of America as represented by the Secretary of the Navy
Filed Dec. 30, 1965, Ser. No. 517,873
9 Claims. (Cl. 313—93)

ABSTRACT OF THE DISCLOSURE

This invention is directed to a proportional counter suitable for detecting X-ray radiation in a range of from about 1 to about 8 angstrom units. The device includes a single housing within which a plurality of anode sections are assembled. A honeycomb collimator provides 10° total collimation for incident radiation and a single window covers all of the anode sections.

---

The invention described herein may be manufactured and used by or for the Government of the United States of America for governmental purposes without the payment of any royalties thereon or therefor.

The present invention is directed to a proportional counter for soft X-ray radiation and more particularly to a large collecting area proportional counter operable to detect X-ray radiation in a range from 1 to 8 angstrom units.

Today there is considerable interest in detecting X-ray radiation from outside the solar system. Such radiation is known to be of a very low intensity and heretofore has not been detected in such quantities as to provide a proper evaluation of such X-ray radiation. It has been determined that in order to obtain a statistically significant number of counts with low intensity radiation, one must have a large collecting area or a long integration time or both. To obtain a reasonable signal to noise ratio this must be combined with a low cross section to cosmic radiation. Such information may be obtained by sateliltes or rocket-borne astronomical instruments. Rocket-borne astronomical instruments are commonly mounted looking out the side of the rocket, and the roll and yaw of the rocket are utilized to scan the celestial sphere. With a typical roll rate of one roll in three seconds, the goal of a long integration time is not possible. Thus, it has been determined that a proportional counter having a large collecting area must be provided to detect desired X-ray radiation in the 1 to 8 angstrom region. Heretofore, detection of soft X-ray radiation from space has not been possible.

The X-ray radiation detector of the present invention has been made of suitable configuration with simple construction to provide a device which is capable of being flown on a rocket or satellite and which is capable of detecting low intensity radiation.

It is therefore an object of the present invention to provide a proportional counter with an extremely high sensitivity with which to detect low fluxes of X-ray photons.

Another object is to provide a proportional counter which is sensitive to X-ray photons in the extended wavelength range from less than about ½ to greater than about 15 angstroms.

Still another object is to provide a proportional counter which possesses a high energy resolution.

Yet another object is to provide a low intensity radiation detector which is of simple construction and yet capable of detecting radiation of low intensity.

The nature of this invention as well as other objects and advantages thereof will be readily apparent from consideration of the following specification relating to the annexed drawing in which:

The drawing is an exploded view partially cut away to show the relative elements of the device.

The proportional counter of the present invention is constructed of a tray-like body with one face covered with a window transparent to the radiation desired to be detected. The tray-like body is divided into four sections with each section having a centrally located anode extended across the tray-like body parallel to the bottom and sides thereof and to each other. The counter window is held in place by a honeycomb collimator that provides approximately 10° total collimation to admit desired radiation into the counter. The divider sections between the anode wires have an opening or passage interconnecting its adjacent sections such that a gas admitted into the counter flows along and surrounds each of the anode wires having the same effect on the operation of the tube.

Now, referring to the drawing, there is shown by illustration a proportional counter made in accordance with the present invention. As shown, the proportional counter includes a main body 10 made into a somewhat rectangular tray-like body. The tray-like structure is divided into four equal compartments across the length thereof by three equally spaced parallel wall partitions 11 within the tray-like structure that extends from the bottom 12 thereof up to the upper surface.

Each of the partitions within the tray-like body is spaced from an end wall at one end to provide a spacing between the end of each of the partitions and the end wall which will permit a gas flow between the different sections formed by the partitions. It is to be noted that the spacing between the end wall and the partition alternates with the partitions such that there is not a through channel across one end of the inner surface of the device. The upper surface of the tray-like body is provided with a shoulder or lip 13 which extends outwardly around the circumference thereof even with the upper wall surface. The shoulder or lip 13 is provided with a U-shaped channel 14 completely around the circumference of the body wherein the U-shaped channel is closer to the inner wall surface of the ends and sides of the device. The purpose of this channel is to allow for the insertion of an O ring 20. When an O ring is so inserted, the hold-down plate presses a Mylar window 16 against the ring and provides a leak-proof seal. The shoulder is provided with apertures 15 therein outwardly of the U-shaped channel to which a Mylar window 16 may be held down by a hold-down plate 17 which may be secured by suitable bolts or screws. The hold-down plate 17 is provided with an outwardly extending shoulder 18 which is secured over the shoulder on the main body and is provided with apertures 19 therein in alignment with the apertures 15 in the main body. Extending upwardly from the extending shoulder 18 is a wall surface 21 which has a slightly larger inner area than the body of the counter to provide an inwardly extending lip or shoulder 22 upon which a honeycomb collimator 23 is secured. The honeycomb collimator 23 provides approximately 10° total collimation and is secured within the hold-down plate by a 90° angle iron 24 formed into a rectangular member which extends downwardly over the outside of the upwardly extending wall surface 21 of the hold-down plate 17. The angle iron 24 is secured to the upwardly extending wall surface of the hold-down plate by any suitable means such as bolts or screws which may be secured by screw-threaded holes 25 within the upwardly extending wall surface of the hold-down plate. The angle iron securing means is provided with a brace 26 across the center thereof which acts as a support to prevent the angle iron from twisting or turning while secured in place.

The end surfaces of the housing are provided with holes therein for the purpose of securing an anode wire 32 centrally of each of the sections in parallel relationship to each other and the partitions forming the sections. A ceramic insulator 33 or any other suitable insulator material is secured to the wall and in the aperture at one end of the housing in a vacuum-tight seal and the anode is secured thereto. At the opposite end of the housing, the anode passes through the aperture in the end of the housing and extends therefrom and is spaced from the wall surface of the housing by suitable insulator connectors 34 such that the anode is insulated from the housing. It has been determined that for maximum efficiency in operation of the tube, the anode wire should be made of uniformly drawn tungsten wire to provide like anode wires in each section of the proportional counter. To prevent severe end effects in tube, the insulating material must extend outwardly along the surface of the wall at each section to provide sufficient shields at the ends of the wire such that the anode wire is shielded from incident photon flux. The body of the proportional counter is made of a suitable metal such as stainless steel wherein the body becomes the cathode of the tube.

It has been determined that in operation of the tube, electrical charges accumulated on the plain Mylar (Mylar is a polyester film of Polyethylene Terephthalate resin which is a trademark of the E. I. duPont de Nemours & Co.) window which distorted the field within the counter and spoiled the resolution thereof. Therefore, the Mylar window is flash-evaporated with 60 angstroms of Nichrome, a trademark of the Driver-Harris Co., (60% nickel-40% chromium) to provide a conductive coating on the inner surface of the window to form an internal surface on the window thereof. It is well known in the art that Mylar as a window material is permeable to water vapor and that water vapor even in small quantities is a serious deterrent to counter resolution. Therefore, the bottom of the main body is provided with a gas inlet opening 35 and a gas outlet opening 36 for the purpose of providing a gas flow through the tube.

As an example, for a typical tube used for the purpose of detecting radiation from ½ to about 15 angstrom units, the main body of the tube has an inside dimension of approximately 5½ inches in length by about 4½ inches in width, with the width of the tube divided into four equal sections by the partitions therein, in which the thickness of the walls of the partitions are approximately 0.125 inch. The inside height of the wall surface is approximately one inch and the hold-down plate and angle-iron support at the top thereof is made to correspond to the dimensions thereof which is well known in machine practices.

In assembly of the proportional counter devce, the main body is machined such that the inside wall surface of the device is smooth without any protrusions thereon. The apertures or holes are made in the end walls and then the anodes are secured in place by use of suitable insulators. A conductive coated Mylar window of suitable size is then placed over the upper surface of the main body and the hold-down plate is then secured in place over the main body. The honeycomb collimator is then formed and placed within the hold-down plate and supported by the shoulder on the inside bottom thereof and secured in place by the angle iron. The tube is now assembled and ready for receipt of suitable gas. The tube is evacuated and a suitable gas such as a P-10 gas (90% Argon, 10% methane) at a pressure of about 760 millimeters is connected to the gas inlet line to introduce gas into the main body. A gas flow rate of 200 cc./min. has been established as a sufficient amount to provide good resolution.

In use, the counter is supplied with a highly regulated high voltage of about 2,000 volts, which is applied to the anode wires in parallel. The signal is taken off a 470 pF high voltage capacitor and fed to a low-noise preamplifier or amplifier. The output of the amplifier is then fed to a rate meter or pulse height analyzer.

A proportional counter made in accordance with the present invention provides a tube with extremely high sensitivity which enables one to detect small amounts of X-ray radiation. The tube of this invention also provides a tube which will provide high energy resolution and extend the wave length range of operation from less than about ½ to greater than 15 angstrom units. It is obvious from observing such a tube that a multiwire counter such as described herein provides a large window area wherein the detector has over 90 square centimeters collecting area which makes the tube an extremely sensitive detector capable of detecting very low X-ray fluxes. The proportional counter has been described as having four separate parallel anode structures; however, it will be obvious to one skilled in the art that the device may be made with more or less anodes and that the gas mixture of the tube may be other than that set forth in this be obvious to one skilled in the art that the device may be made to detect radiation over a different wave-length range.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A proportional counter tube structure which comprises:
   a main body,
   said body having a tray-like rectangular shape forming a cathode,
   partitions dividing said body into equally divided linear sections across the width thereof to provide separate sections longitudinally of the body,
   each of said partitions havinng a height equal to the depth of said main body and including an opening therein to provide a gaseous flow passage between each of said sections,
   an anode extending along the axis of each of said longitudinal sections and insulated from said body,
   said anode of each section being connected electrically in parallel with each other,
   a window enclosing said main body and extending over all of the longitudinal sections of said body whereby said window admits desired radiation to all of said sections and
   a gas inlet and a gas outlet in said body.

2. A proportional counter tube as claimed in claim 1, which includes:
   a collimator secured over said window to collimate incident radiation.

3. A proportional counter as claimed in claim 2, wherein:
   said window is mylar having a coating of Nichrome thereon.

4. A proportional counter tube as claimed in claim 3, wherein:
   said anodes of each section are of highly uniform tungsten wire.

5. A proportional counter tube as claimed in claim 4, wherein:
   said collimator provides approximately 10-degree total collimation.

6. A proportional counter tube as claimed in claim 5, wherein:
   said body includes at least four longitudinal sections, and
   at least four anodes parallel with each other and the window.

7. A proportional counter as claimed in claim 5, wherein:
   said anodes of each separate section are subjected to the same body of gas admitted into said main body.

8. A proportional counter as claimed in claim 6, in which:
   a gas filling is admitted into said body at a pressure of 760 torr.

9. A proportional counter as claimed in claim 8, wherein:
   said gas is 90% argon and 10% methane.

References Cited

UNITED STATES PATENTS

| | | | |
|---|---|---|---|
| 2,153,586 | 4/1939 | Nicolson | 178—7.85 |
| 2,509,700 | 5/1950 | Simpson | 313—93 X |
| 2,599,352 | 6/1952 | Schneider | 313—93 |
| 2,701,312 | 2/1955 | Lord | 250—83.6 |
| 2,837,656 | 6/1958 | Hendee et al. | 250—83.6 X |
| 2,837,678 | 6/1958 | Hendee et al. | 313—93 |
| 2,985,785 | 5/1961 | Softky | 313—93 |
| 3,048,698 | 8/1962 | Carlson | 250—105 X |
| 3,296,478 | 1/1967 | Ichinokawa | 313—93 |
| 3,322,991 | 5/1967 | Sterk et al. | 313—93 |

DAVID J. GALVIN, *Primary Examiner.*

P. C. DEMEO, *Assistant Examiner.*